Sept. 4, 1962   H. J. BAMBI   3,052,076
COMBINED SELF-PROPELLED, SELF-GUIDING
TRACTOR AND ROTARY MOWER APPARATUS
Filed Feb. 10, 1961   2 Sheets-Sheet 1

INVENTOR.
Harry J. Bambi
BY
ATTORNEYS

Sept. 4, 1962 H. J. BAMBI 3,052,076
COMBINED SELF-PROPELLED, SELF-GUIDING
TRACTOR AND ROTARY MOWER APPARATUS
Filed Feb. 10, 1961 2 Sheets-Sheet 2
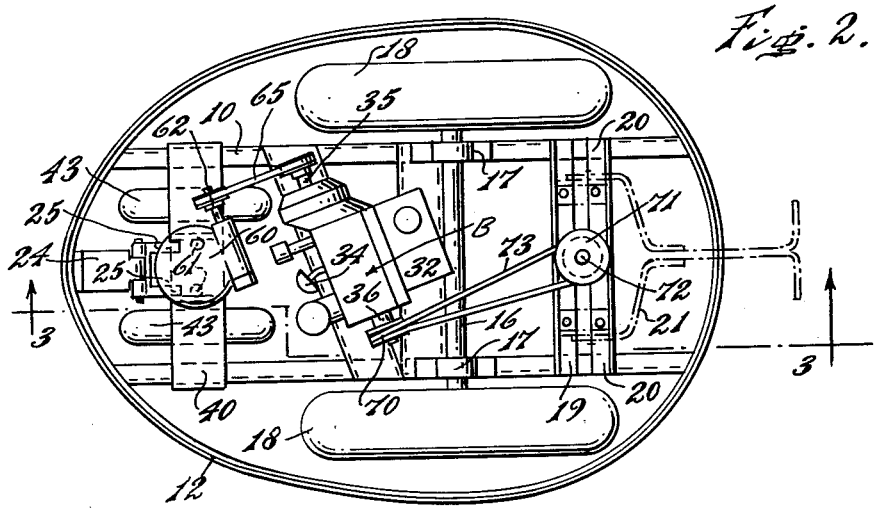
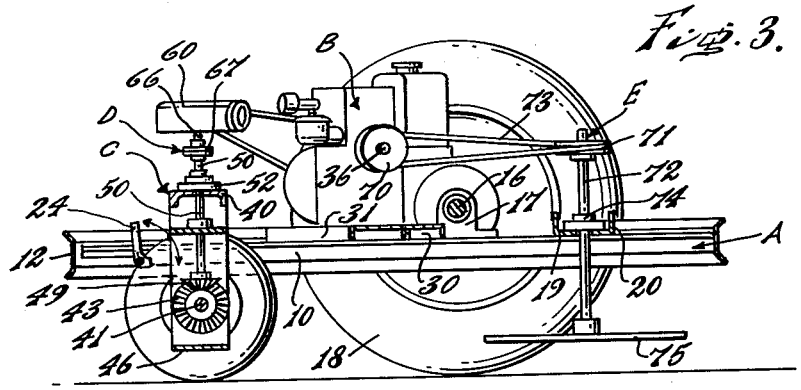
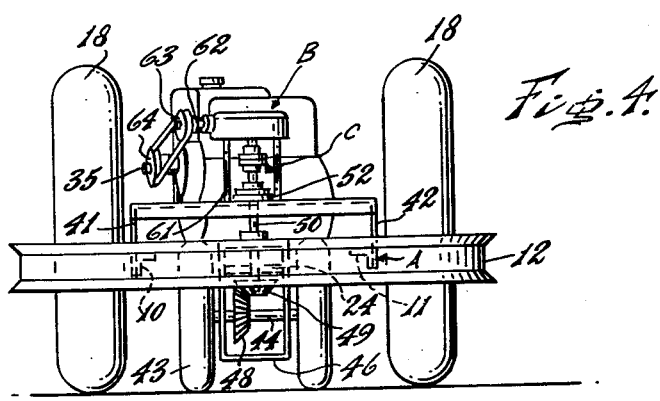
INVENTOR.
Harry J. Bambi
BY
Belcher & Mayerman
ATTORNEYS United States Patent Office 3,052,076
Patented Sept. 4, 1962

3,052,076
COMBINED SELF-PROPELLED, SELF-GUIDING TRACTOR AND ROTARY MOWER APPARATUS
Harry J. Bambi, 531 E. Fornance St., Norristown, Pa.
Filed Feb. 10, 1961, Ser. No. 88,355
12 Claims. (Cl. 56—25.4)

This invention relates to self-propelled, self-guiding, agricultural equipment, accessories therefor and methods of use thereof. More particularly, it relates to a self-propelled, self-guiding tractor which follows a random pattern of travel within a previously delineated area, to accessories for use therewith and to methods of using this equipment to perform routine agricultural tasks.

In the past, small tractors have found widespread use on the farm and in suburban residential areas. Most, if not all of these units are provided with power take-offs and a series of attachments. However, prior art devices all required the guidance of an operator at all times either in person, as by the operation of a steering mechanism, or by sophisticated electrical or electronic devices which also require operator attendance, albeit at a remote location. Devices have also been available which followed a predetermined path of travel, often a previously plowed furrow or a row of plants. Such devices would obviously necessitate marring the appearance of turf, if employed as mowers, nor would they be suitable where a non-regular, random pattern is desired which will differ each time the device is operated.

Accordingly, it is an object of this invention to provide a self-propelled, self-guiding tractor which follows a random pattern of travel.

Another object of this invention is to provide a self-propelled tractor which changes its direction of travel upon encountering an obstacle.

It is also an object of this invention to provide a self-propelled, self-guiding tractor which can, if desired, be operated with conventional manual guide means.

A further object of the invention is to provide a barrier system for delineating an area, which will cooperate with a self-guiding, self-propelled tractor to cause a change of direction upon contact therewith.

Still another object of the invention is to provide a self-propelled, self-guiding rotary disc mower which follows a random pattern of travel within a delineated area.

Yet another object of the invention is to provide a self-propelled rotary mower which changes its direction of travel upon encountering an obstacle having a fixed height.

Another object of the invention is to provide a self-guiding, self-propelled agricultural prime mover which is adapted to move across an area in a fixed direction of travel until it contacts a pre-positioned barrier delineating the area, whereupon its direction of travel is changed by an automatic turning or reversal of travel so that the total area is continually traversed in a random pattern.

It is also an object of this invention to provide a self-propelled, self-guiding tractor having a power take-off and which is adapted for use with accessories which will enable its use for spraying, cultivating, dusting, mowing and cutting, discing, harrowing, seeding, snow plowing, flaming, rotary tillage, rotary weed cutting, application of liquid or solid fertilizers and pest control.

The invention also includes among its objects methods of using said self-propelled, self-guiding apparatus in connection with rotary mowing, spraying, cultivating, dusting, cutting, discing, harrowing and other agricultural operations.

Other objects of the invention are to provide an improved device of the character described that is easily and economically produced, which is sturdy in construction and which is highly efficient in operation.

With the above and related objects, which will be apparent to those skilled in the art, in view consideration should now be given to the following detailed description of an embodiment of the invention which is intended to be considered in connection with the accompanying drawings wherein:

FIGURE 2 represents a plan view of a rotary disc mower embodying my invention.

FIGURE 3 represents a section taken along 3—3 of FIGURE 2.

FIGURE 4 represents an end view, taken from the driving wheel end, of the mower shown in FIGURE 2.

Figure 1:
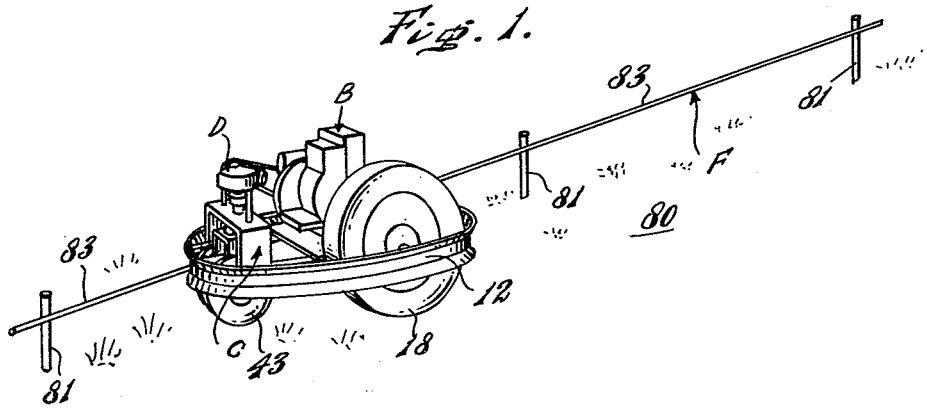
FIGURE 1 represents a perspective view of a tractor embodying my invention shown abutting a portion of the barrier system.
Figure 5:
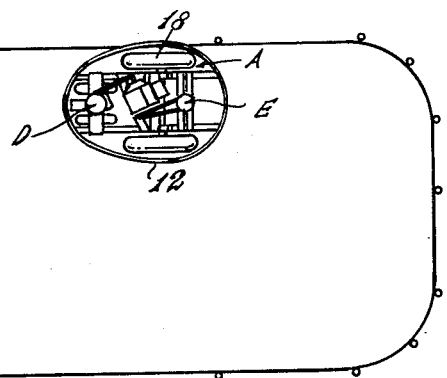
FIGURE 5 is a plan view illustrating the operation of the device of FIGURE 2 within a delineated area.

Referring now to the drawings, wherein like reference numerals indicate like parts, it will be observed that the tractor of the invention includes a main frame A; a motor assembly B; a drive wheel support frame C; and drive wheel power transmission D. Optionally, it may also include an auxiliary power transmission E. The device is designed for cooperation with a barrier system F, as indicated in FIGURES 1 and 5.

Figure 7:
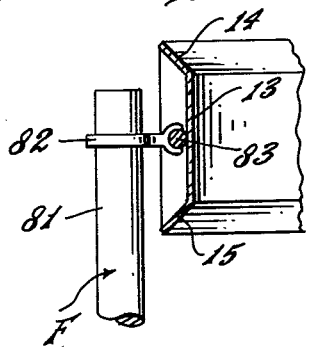
FIGURE 7 is a detail showing the means whereby the barrier system cooperates with the self-propelled, self-guiding tractor of the invention.

The main frame A may be generally rectangular and includes longitudinal stringers or beams 10 and 11 to which are welded or otherwise suitably affixed a plurality of cross members. Since these cross members, as indicated on FIGURE 2 may, most economically, perform functions in addition to lending rigidity to the frame, they will be detailed infra in connection with their other functions. The frame A is also made rigid by virtue of a perimetrical bumper, generally designated as 12, which surrounds the entire tractor and is welded to the frame at several places such as the ends of beams 10 and 11. As best shown in FIGURE 7, the bumper includes a generally vertical web 13 and terminates in an upper outwardly flared flange 14 and a lower outwardly flared flange 15. An axle 16 is journaled into pillow blocks 17 which are affixed to the main frame and on the axle are mounted suitably tired idler wheels 18 which, as shown in FIGURE 1, are of relatively large diameter.

The main frame cross members previously referred to include angles 19 and 20 which are welded to stringers 10 and 11. These angles, in the embodiment shown in FIGURES 2 to 4, find utility in connection with a rotary mower and also serve as a point of attachment for a removable handle 21.

A motor assembly B is mounted on main frame A and motor support plates such as transverse plate 30 and canted transverse plate 31 are provided for this purpose. These plates also add rigidity to the frame. The motor is a conventional internal combustion engine and is preferably of the type operating on a liquid or liquefied hydrocarbon such as, for example, a 4-cycle gasoline powered engine. The engine, in addition to all the usual components such as fuel tank 32, block 33, and starter 34 includes a main drive shaft 35 and an auxiliary power take off shaft 36. If desired, conventional clutch assemblies may be provided for either or both shafts.

Also mounted on frame A is a drive wheel support frame C which is dependent from a cross bracket 40.

As best shown in FIGURES 2–4, this bracket is generally U-shaped and its downwardly directed legs 41 and 42 are affixed, respectively, to longitudinal main frame members 10 and 11. The drive wheels 43 are mounted on axle 44 and this axle is journaled through the sides 45 of an open, generally rectangular hanger box which further includes a bottom plate 46 and a top plate 47. Mounted on axle 44 and keyed thereto is a bevel gear 48 which meshes with another bevel gear 49 mounted on vertical drive shaft 50. A spacer assembly 51, which includes radial and thrust bearings, is mounted on top plate 47 and serves to keep drive shaft 50 in fixed position with respect thereto while leaving it free to rotate. Finally, shaft 50 is journal through a bearing assembly 52 which is mounted atop cross bracket 40. This bearing assembly has both radial and thrust components and provides for substantially frictionless rotation of shaft 50 while it also tends to fix its vertical relationship to cross bracket 40. Obviously, other suitable means may be used for keeping plate 47 in fixed vertical spaced relation to bracket 40 and for keeping shaft 50 in fixed position, the means just described being illustrative only. As shown the drive wheel support frame C is thus free to pivot about the vertical axis of shaft 50 while axle 44 is maintained at a fixed elevation.

Power is supplied to shaft 50, and thus to drive wheels 43 by a drive wheel power transmission D. The transmission includes a right-angle gear reducer 60 which is mounted in fixed position above and on cross bracket 40 by means of a plurality of posts 61. The reducer 60 includes a horizontal input shaft 62 on which is mounted a sheave 63. Motor shaft 35 is provided with a companion sheave 64 and the two sheaves are operatively connected by a V-belt 65. The vertical gear reducer output shaft 66 is coupled to shaft 50 with a coupling, preferably a flexible coupling 67. Thus, rotation of motor shaft 35 is transmitted to drive axle 44.

The embodiment shown in FIGURES 2 to 4 is both a tractor and a rotary mower. Power for the cutter element is supplied by an auxiliary power transmission E which may also be used, alternatively to power other accessories. The transmission includes a sheave 70 mounted on auxiliary power shaft 36 and a companion driven sheave 71 which is keyed onto mower shaft 72. The two sheaves are operatively connected by a V-belt 73. Mounted astride cross angles 19 and 20 is a thrust and radial bearing assembly 74 through which vertical shaft 72 is journaled. This bearing assembly may include provision for vertical adjustment of shaft 72 thus enabling mower blade 75, which is mounted on the end of the shaft, to be adjusted in elevation.

Instead of a rotary mower, other apparatus such as a compressor powered spray may be mounted on the main frame A and take its power from transmission E. Also, conventional hitches may be affixed to the main frame and the tractor used to draw agricultural implements and machinery of the type previously enumerated.

The barrier system F, used in connection with the tractor of the invention, is shown generally in FIGURES 1 and 5 and is detailed in FIGURE 7. An area 80, within which the device is operated, is delineated with a plurality of stakes or rods 81. Each rod is provided with a cantilevered clamp 82 adapted to receive and support a cable or wire rope 83. The height of the cable 83 is fixed so that it will contact the bumper 12 intermediate flanges 14 and 15. Any natural barriers such as tree trunk 84 may be incorporated in the barrier system provided only that they exist at bumper height (i.e. between flanges 14 and 15) and are, of course, suitably located. Thus, for instance, operation as a sprayer or cultivator within an orchard would require little in the way of artificial barriers.

Considering now the operation of the unit, it is first necessary to delineate the area 80 as shown in FIGURE 5. Actually this need be done only once since the barrier system can be permanently installed and provision made for ingress and egress of the tractor. The tractor is placed within the area and the motor B is started. Power is delivered to wheels 43 and the unit begins to move in a direction dependent upon the orientation of axle 44. Before long, perimetrical bumper 12 will contact the barrier system F and forward motion will be arrested. At that time the natural tendency of drive wheels 43 to rotate about shaft 50 will be evidenced, and the two drive wheels will turn as full power is made available for turning the drive wheel support frame C. Once the direction of travel of wheels 43 is such that they no longer urge bumper 12 into contact with the barrier system F, power is utilized for movement of the tractor, normal torque relationships are restored and the self-propelled tractor moves off in another, albeit unpredictable, direction. When the barrier system is again encountered, this operation is repeated. Thus area 80 is continually traversed in a random pattern. When the integral auxiliary device is the rotary mower shown in FIGURES 2 to 4, the result, after a period of time, will be substantially complete mowing of the entire area. Although it is impossible to calculate the exact percentage of area which will have been covered after a fixed period of time, experience will dictate an optimum time for self-guiding operation within a given delineated area. For perfectionists, who want to leave no turf unshorn, auxiliary manual guidance means are provided to be utilized after the expiration of the aforementioned optimum period. Suitable time controls or merely a rationed fuel supply can be employed to cause the device to cease operation at the end of this fixed time.

Figure 6:
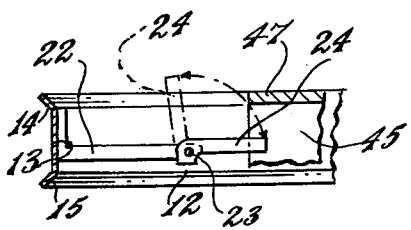
FIGURE 6 is a side elevation, partially broken away, of a means for locking out the pivotal action of the drive wheels of the devices illustrated in FIGURES 1 and 2.

A locking device, best shown in FIGURES 2, 3 and 6 is provided. This includes an angled bracket 22 which is welded to bumper 12, preferably at web 13. Attached to the bracket, as with a 180° limit hinge 23, is a clevis 24 including legs 25. In the unlocked positon (shown in phantom in FIG. 6 and also shown in FIG. 3) the tractor is self-guiding. However, in the locked position (shown in FIG. 2) the clevis 24 is horizontal, the legs 25 extend into the hanger box abutting sides 45 and prevent rotation thereof with respect to shaft 50. The drive direction is thus fixed. Manual guidance is then achieved with handle 21 which may be removed except when required for such guidance.

The same modus operandi may be used when the tractor is employed in connection with farm equipment. In order to facilitate reversal of direction articulated hitches are best employed. In cases such as fertilizing, where exact amounts of material must be distributed per unit area total manual guidance is used. However, the potential for self-guidance is always present and available for use merely by removing handle 21 and lifting clevis 24 out of locked positon. With such flexibility, the device may perform all functions of small prior art tractors as well as those operations which benefit particularly from random pattern self-guidance.

While a particular embodiment of the present invention has been herein illustrated and described, it is not intended to limit the invention to such disclosure, but changes and modifications may be made therein and thereto within the scope of the following claims.

I claim:

1. A self-propelled, self-guiding, random pattern of travel agricultural apparatus comprising a main frame including longitudinal members and cross members; a perimetrical bumper encompassing said main frame; a motor mounted on said main frame; a pair of relatively large idler support wheels rotatably mounted on said main frame in a fixed vertical plane proximate one end thereof within the confines of said bumper; a clevis shaped drive wheel support frame rotatably mounted on said main frame distal said idler support wheels within said perimetrical bumper, said frame being freely rotatable about its own vertical axis; a horizontal drive shaft journaled into the legs of said clevis shaped support frame;

relatively small drive wheels rotatably mounted on said horizontal drive shaft; implement means for treating the area traversed by said apparatus; a vertical drive shaft pinioned to said horizontal drive shaft and extending upwardly therefrom through the bight of said support frame and rotatable with respect thereto; a gear reducer mounted above said vertical drive shaft and connected thereto; drive means connecting said motor to said gear reducer; contact of said perimetrical bumper with an obstacle causing motion of the apparatus toward said obstacle to be arrested and the drive wheel support frame to rotate until travel can be resumed in an unobstructed albeit inpredeterminate direction.

2. The apparatus of claim 1 which further includes a tongue shaped locking device which, in locking position, extends between the legs of said clevis shaped support frame to prevent rotation thereof and a guide handle, removably attached to said main frame.

3. A self-propelled, self guiding, random pattern of travel agricultural apparatus comprising a main frame including a continuous perimetrical bumper affixed thereto; a motor mounted on and supported by said main frame; a pair of idler support wheels rotatably mounted on said main frame but incapable of angular displacement with respect thereto; a drive wheel support frame rotatably mounted on said main frame within said perimetrical bumper and freely rotatable about its own vertical axis; drive wheels rotatably mounted on said support frame; implement means for effecting the area traversed by said apparatus; and power transmission means operatively connecting said motor to said drive wheels even when said drive wheel support frame is rotating; contact of said perimetrical bumper with an obstacle causing motion of the apparatus toward said obstacle to be arrested and the drive wheel support frame to rotate until travel can be resumed in an unobstructed albeit inpredeterminate direction.

4. The apparatus of claim 3 which further includes a locking means for preventing rotational motion of said drive wheel support frame and a manual guide removably attached to said main frame.

5. Agricultural apparatus for delineating and treating a given area comprising (a) a self-propelled, self-guiding, random pattern of travel vehicle comprising a main frame including a perimetrical bumper; a motor mounted on and supported by said main frame; a plurality of idler support wheels rotatably mounted on said main frame but incapable of angular displacement with respect thereto; a drive wheel support frame rotatably mounted on said main frame within said perimetrical bumper and freely rotatable about its own vertical axis; drive wheels rotatably mounted on said drive wheel support frame; implement means for effecting the area traversed by said apparatus; and power transmission means operatively connecting said motor to said drive wheels even when said drive wheel support frame is rotating and (b) a boundary guide at the perimetrical bumper height delineating the area within which said vehicle is to operate; contact of said bumper with said guide causing motion of the vehicle theretoward to be arrested and the drive wheel support frame to rotate until travel can be resumed in an unobstructed albeit inpredeterminate direction.

6. The apparatus of claim 5 wherein said vehicle further includes a locking means for preventing rotational motion of said drive wheel support frame and a manual guide removably attached to said main frame.

7. The apparatus of claim 1 wherein said implement means is a disc mower.

8. The apparatus of claim 2 wherein said implement means is a disc mower.

9. The apparatus of claim 3 wherein said implement means is a disc mower.

10. The apparatus of claim 4 wherein said implement means is a disc mower.

11. The apparatus of claim 5 wherein said implement means is a disc mower.

12. The apparatus of claim 6 wherein said implement means is a disc mower.

References Cited in the file of this patent

UNITED STATES PATENTS

| | | |
|---|---|---|
| 1,534,285 | Riehl | Apr. 21, 1925 |
| 1,980,553 | Salisbury | Nov. 13, 1934 |
| 2,339,291 | Paulus et al. | Jan. 18, 1944 |
| 2,496,727 | Jenkins | Feb. 7, 1950 |
| 2,641,869 | Raze | June 16, 1953 |
| 2,789,649 | Setzer | Apr. 23, 1957 |
| 2,815,633 | Meyer | Dec. 10, 1957 |
| 2,847,077 | Vaughan | Aug. 12, 1958 |
| 2,925,875 | Bourdon | Feb. 23, 1960 |